(12) United States Patent
Yun

(10) Patent No.: US 7,206,118 B2
(45) Date of Patent: Apr. 17, 2007

(54) OPEN HOLE-BASED DIFFRACTIVE LIGHT MODULATOR

(75) Inventor: Sang Kyeong Yun, Kyunggi-do (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 11/152,823

(22) Filed: Jun. 13, 2005

(65) Prior Publication Data

US 2006/0077526 A1  Apr. 13, 2006

Related U.S. Application Data

(63) Continuation-in-part of application No. 10/952,573, filed on Sep. 28, 2004, now Pat. No. 7,173,751.

(30) Foreign Application Priority Data

Jan. 5, 2005   (KR) .................. 10-2005-0000907
Apr. 26, 2005  (KR) .................. 10-2005-0034685

(51) Int. Cl.
*G02B 26/00* (2006.01)

(52) U.S. Cl. .................. 359/291; 359/290; 359/223; 359/224

(58) Field of Classification Search ............... 359/290, 359/291, 223, 224, 226, 238, 292, 295
See application file for complete search history.

(56) References Cited

U.S. PATENT DOCUMENTS

| 5,311,360 A | 5/1994 | Bloom et al. |
| 5,949,570 A | 9/1999 | Shiono et al. |
| 6,141,139 A | 10/2000 | Furlani et al. |

*Primary Examiner*—Timothy Thompson
(74) *Attorney, Agent, or Firm*—Christensen O'Connor Johnson Kindness PLLC

(57) ABSTRACT

This invention relates to a diffractive light modulator. Particularly, the invention relates to an open-hole based diffractive light modulator. In the modulator, a lower reflective part is provided on a base member and open holes are formed through an upper micromirror raised from the base member so that one pixel is formed using one element having the ribbon-shaped upper micromirror.

27 Claims, 10 Drawing Sheets

OPEN HOLE-BASED DIFFRACTIVE LIGHT MODULATOR

BACKGROUND OF THE INVENTION

1. Field of the Invention

The present invention relates, in general, to a diffractive light modulator and, more particularly, to an open-hole based diffractive light modulator, in which a lower reflective part is provided on a base member and open holes are formed through an upper micromirror raised from the base member so that one pixel is formed using one element having the upper micromirror.

2. Description of the Related Art

Generally, an optical signal processing technology has advantages in that a great amount of data is quickly processed in a parallel manner unlike a conventional digital information processing technology in which it is impossible to process a great amount of data in real time. Studies have been conducted on the design and production of a binary phase filter, an optical logic gate, a light amplifier, an image processing technique, an optical device, and a light modulator using a spatial light modulation theory.

The spatial light modulator is applied to optical memory, optical display device, printer, optical interconnection and hologram fields, and studies have been conducted to develop a display device employing it.

The spatial light modulator is embodied by a reflective deformable grating light modulator 10 as shown in FIG. 1. The modulator 10 is disclosed in U.S. Pat. No. 5,311,360 by Bloom et al. The modulator 10 includes a plurality of reflective deformable ribbons 18, which have reflective surface parts, are suspended on an upper part of a silicon substrate 16, and are spaced apart from each other at regular intervals. An insulating layer 11 is deposited on the silicon substrate 16. Subsequently, a sacrificial silicon dioxide film 12 and a low-stress silicon nitride film 14 are deposited.

The nitride film 14 is patterned by the ribbons 18, and a portion of the silicon dioxide film 12 is etched, thereby maintaining the ribbons 18 on the oxide spacer layer 12 by a nitride frame 20.

In order to modulate light having a single wavelength of $\lambda_o$, the modulator is designed so that thicknesses of the ribbon 18 and oxide spacer 12 are each $\lambda_o/4$.

Limited by a vertical distance (d) between a reflective surface 22 of each ribbon 18 and a reflective surface of the substrate 16, a grating amplitude of the modulator 10 is controlled by applying voltage between the ribbon 18 (the reflective surface 22 of the ribbon 18 acting as a first electrode) and the substrate 16 (a conductive layer 24 formed on a lower side of the substrate 16 to act as a second electrode).

In an undeformed state of the light modulator with no voltage application, the grating amplitude is $\lambda_o/2$ while a total round-trip path difference between light beams reflected from the ribbon and substrate is $\lambda_o$. Thus, a phase of reflected light is reinforced.

Accordingly, in the undeformed state, the modulator 10 acts as a plane mirror when it reflects incident light. In FIG. 2, the reference numeral 20 denotes the incident light reflected by the modulator 10 in the undeformed state.

When proper voltage is applied between the ribbon 18 and substrate 16, the electrostatic force enables the ribbon 18 to move downward toward the surface of the substrate 16. At this time, the grating amplitude is changed to $\lambda_o/4$. The total round-trip path difference is a half of a wavelength, and light reflected from the deformed ribbon 18 and light reflected from the substrate 16 are subjected to destructive interference.

The modulator diffracts incident light 26 using the interference. In FIG. 3, reference numerals 28 and 30 denote light beams diffracted in +/−diffractive modes (D+1, D−1) in the deformed state, respectively.

However, the light modulator by Bloom adopts an electrostatic method to control the position of a micromirror, which is disadvantageous in that operation voltage is relatively high (usually 30 V or so) and the relationship between the applied voltage and displacement is not linear, thus resulting in poor reliability in the control of light.

The light modulator described in the patent of Bloom can be used as a device for displaying images. In this case, a minimum of two adjacent elements may form a single pixel. Of course, three elements may form a single pixel, or four or six elements may form a single pixel.

However, the light modulator described in the patent of Bloom has a limitation in achieving miniaturization. That is, the light modulator has a limitation in that the widths of the elements thereof cannot be formed to be below 3 μm and the interval between elements cannot be formed to be below 0.5 μm.

Furthermore, a minimum of two elements is required to constitute a diffraction pixel, thus having a limitation in the miniaturization of a device.

SUMMARY OF THE INVENTION

Accordingly, the present invention has been made keeping in mind the above problems occurring in the prior art, and an object of the present invention is to provide a diffractive light modulator in which one pixel is formed using as few as one ribbon element, thereby miniaturizing goods.

In order to accomplish the above object, the present invention provides an open hole-based diffractive light modulator, comprising a base member; a first reflective part supported by the base member and including an intermediate portion spaced apart from the base member so as to define a space therebetween, a first surface facing away from the base member and functioning as a reflective surface to reflect incident light, and at least one open hole extending through the first reflective part formed so as to pass the incident light therethrough; a second reflective part located between the first reflective part and the base member, said second reflective part spaced apart from the first reflective part and comprising a reflective surface facing the first reflective part to reflect the incident light passing through the at least one open hole; and an actuating unit for moving the intermediate portion of the first reflective part relative to the second reflective part to change the intensity of diffracted light which is formed using light reflected from the first reflective part and the second reflective part.

In a further aspect of the present invention, the first reflective part spanning a recess formed in the base member, the second reflective part supported by the sidewalls of the recess of the base member to be in parallel spaced relationship to the first reflective part, the second reflective part movable toward or away from the first reflective part to reflect the incident light passing through the open holes; and the actuating unit moving the second reflective part relative to the first reflective part to change the intensity of diffracted light which is formed using light reflected from the first reflective part and the second reflective part.

Furthermore, the present invention provides an open hole-based diffractive light modulator, comprising a base member; a plurality of first reflective parts arranged to form an array, each of which is spaced apart at an intermediate portion thereof from the base member so as to form a space therebetween, each of which is supported by the base member, each of which has a reflective surface directed away from the base member to reflect incident light, and each of which has at least one hole formed so as to pass the incident light therethrough; a second reflective part located between the first reflective part and the base member so as to define a space relative to the first reflective part and which has a reflective surface to reflect the incident light passing through the open holes; and a plurality of actuating units for moving the intermediate portion of a corresponding first reflective part to change the intensity of diffracted light which is formed using light reflected from the first reflective part and the second reflective part.

In a further aspect of the present invention, the first reflective parts spanning a recess defined by the base member, said second reflective parts arranged to form an array, and supported by the sidewalls of the recess of the base member to be in parallel spaced apart relationship to corresponding first reflective parts, the second reflective parts movable toward or away from the first reflective parts to reflect the incident light passing through the open holes; said actuating units moving corresponding second reflective parts relative to a first reflective part to change the intensity of diffracted light which is formed using light reflected from the first reflective parts and the second reflective parts.

Additionally, the present invention provides a display device using an open hole-based diffractive light modulator, comprising a light source emitting light; the open hole-based diffractive light modulator modulating incident light to generate diffracted light; a light optical part for applying the incident light emitted from the light source to the open-hole based diffractive light modulator; a filtering optical part for selecting the desired orders of diffracted light from diffracted light which is modulated by the open-hole based diffractive light modulator so as to pass the selected diffracted light therethrough; and a projection and scanning optical part for scanning the diffracted light which pass through the filtering optical part on a screen. The open hole-based diffractive light modulator comprises a base member; a plurality of first reflective parts arranged to form an array, each supported by the base member so as to form spaces between intermediate portions of the first reflective part and the base member and each first reflective part has open holes formed therein, so as to pass the light therethrough, and a reflective surface to reflect the incident light; a second reflective part supported by the base member, said second reflective part spaced apart from the first reflective parts, said second reflective part comprising a reflective surface to reflect the incident light passing through the open holes of the first reflective parts; and a plurality of actuating units for moving the intermediate portions of the corresponding first reflective parts relative to a second reflective part to change the intensity of the diffracted light which is formed using light reflected from the first reflective parts and the second reflective parts.

Additionally, the present invention provides an open hole-based diffractive light modulator, comprising a substrate; an insulating layer disposed on the substrate; at least one sacrificial layer which is disposed on the insulating layer; a reflective part disposed on the insulating layer, the reflective part positioned to reflect incident light; a support which is provided on the at least one sacrificial layers and through which first open holes are formed; a micromirror disposed on the support, said micromirror having a reflective surface to reflect the incident light, second open holes formed in the micromirror to correspond to the first open holes to pass the incident light therethrough; and at least one actuating unit to move an intermediate portion of the support when voltage is applied thereto, thereby changing intensity of diffracted light which is formed using light reflected from the micromirror and the reflective part.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Preferred embodiments of the present invention will be described in detail, with reference to FIGS. 4a to 8b below.

Figure 1:
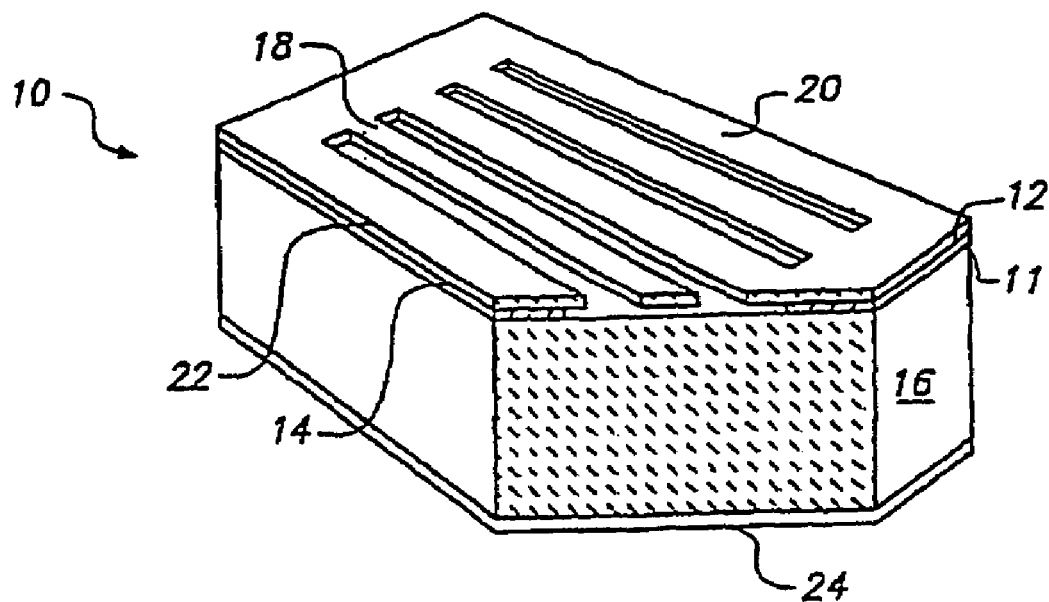
FIG. 1 illustrates a grating light modulator adopting an electrostatic method according to a conventional technology.
Figure 2:
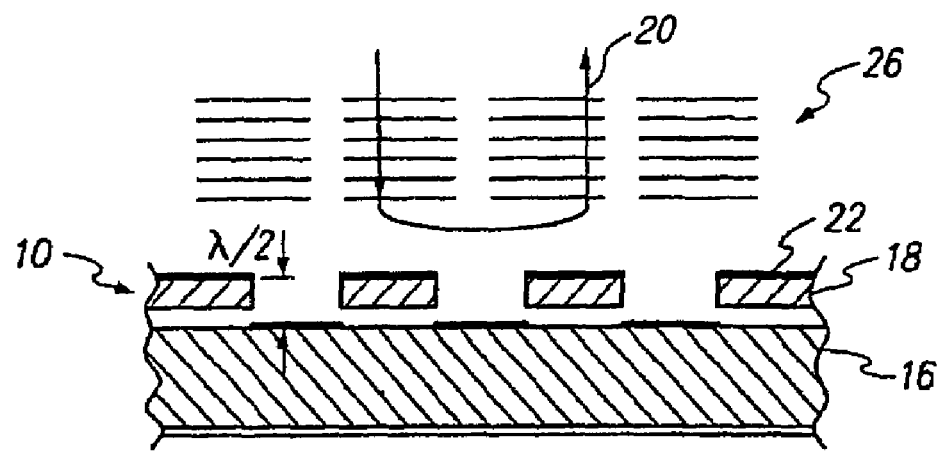
FIG. 2 illustrates reflection of incident light by the grating light modulator adopting the electrostatic method according to the conventional technology in an undeformed state.
Figure 3:
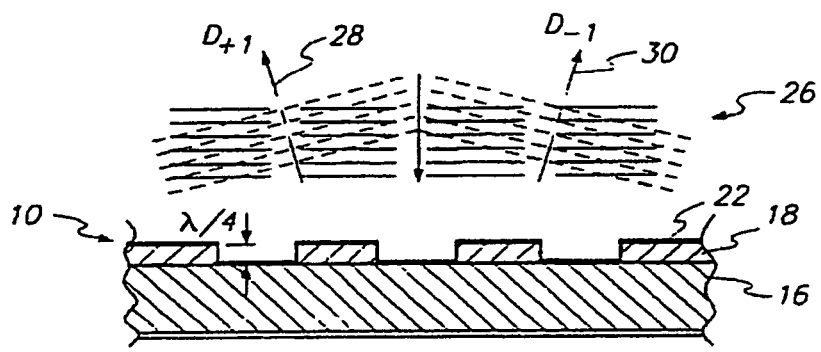
FIG. 3 illustrates diffraction of incident light by the grating light modulator according to the conventional technology in a deformed state caused by an electrostatic force.
Figure 4A:
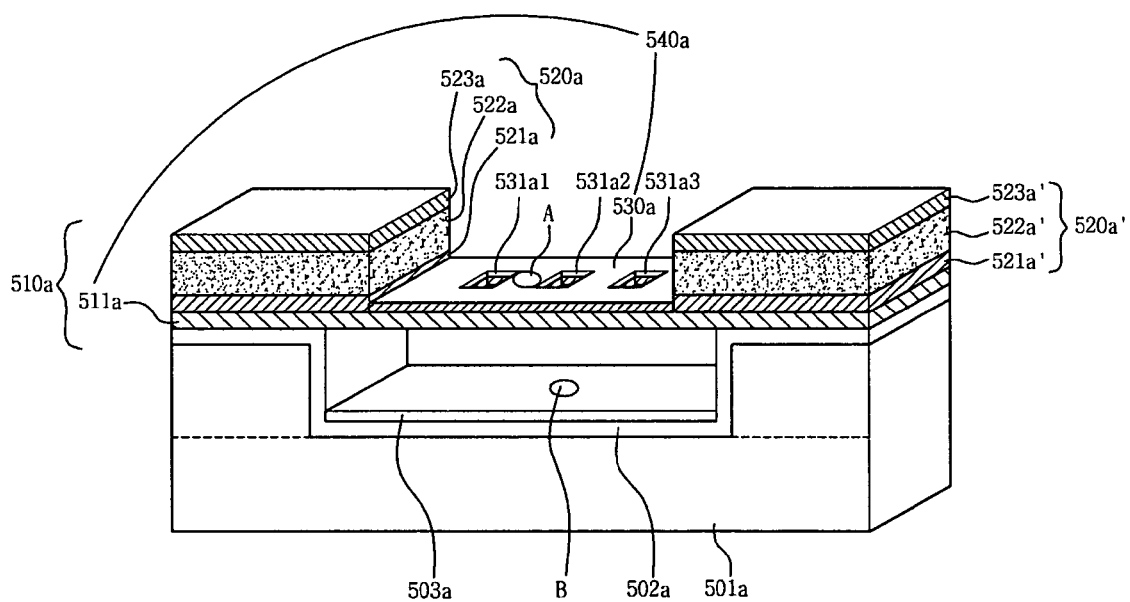
FIG. 4a is a perspective view of an open hole-based diffractive light modulator, which is partially broken away, according to the first embodiment of the present invention.

FIG. 4a is a perspective view of an open hole-based diffractive light modulator, according to the first embodiment of the present invention.

Referring to the drawing, the open hole-based diffractive light modulator according to the first embodiment of the present invention includes a silicon substrate 501a, an insulating layer 502a, a micromirror 503a, and an element 510a. Although the insulating layer and the micromirror are illustrated as constructed in separate layers in this embodiment, the insulating layer can be implemented to function as the lower micromirror if it has light-reflective characteristics. Furthermore, herein, the insulating layer 502a is shown as formed on a surface of the base member 501a, but the insulating layer is not essential, thus the reflective part 503a may be formed without forming the insulating layer 502a.

The silicon substrate 501a includes a recess for providing a space for the element 510a, the insulating layer 502a is formed on the silicon substrate 501a, the lower micromirror 503a is deposited above the silicon substrate 501a, and the bottom of the element 510a is attached to or otherwise supported by both sides of the silicon substrate 501a outside the recess. A material, such as Si, $Al_2O_3$, $ZrO_2$, Quartz and $SiO_2$, may be used to constitute the silicon substrate 501a, and the lower and upper layers of the silicon substrate 501a (divided by a dotted line) may be formed using different materials. Additionally, a glass substrate may be used as the base member 501a.

The lower micromirror 503a is located on an upper side of the base member 501a, and reflects incident light. A micromirror may be used as the lower reflective part 503a, and metal, such as Al, Pt, Cr or Ag, can be used to constitute the lower micromirror 503a.

The element 510a is illustrated as formed in an elongate, thin ribbon shape, however, the element can be formed in other shapes, such as rectangular, square, oval, etc. The element 510a includes a lower support 511a, the bottoms of both sides of which are attached to or otherwise supported by sides of the silicon substrate 501a outside the recess of the silicon substrate 501a so as to allow the center portion of the element 510a to be spaced apart from the recess. The term 'lower support' 511a is named because it is situated under piezoelectric layers 520a and 520a'.

The piezoelectric layers 520a and 520a' may be provided on both sides of the lower support 511a, respectively, and the actuating force of the element 510a is provided through the shrinkage and expansion of the provided piezoelectric layers 520a and 520a'.

Si oxide (e.g., $SiO_2$, etc.), Si nitride (e.g., $Si_3N_4$, etc.), a ceramic substrate (Si, $ZrO_2$ and $Al_2O_3$, etc.), or Si carbide can be used to constitute the lower support 511a. Such a lower support 511a can be omitted according to necessity.

The left or right piezoelectric layer 520a or 520a' includes a lower electrode layer 521a or 521a' adapted to provide piezoelectric voltage, a piezoelectric material layer 522a or 522a' formed on the lower electrode layer 521a or 521a' and adapted to generate a vertical actuating force through shrinkage and expansion when voltage is applied to both sides thereof, and an upper electrode layer 523a or 423a' formed on the piezoelectric material layer 521a or 521a' and adapted to provide piezoelectric voltage to the piezoelectric material layer 521a or 521a'. When voltage is applied to the upper electrode layers 523a and 523a' and the lower electrode layer 521a and 521a', the piezoelectric material layers 521a and 521a' shrink and expand, thus causing the lower support 511a to move vertically toward or away from the micromirror 503a.

Pt, Ta/Pt, Ni, Au, Al, Ti/Pt, $IrO_2$ and $RuO_2$ can be used as the materials of the electrodes 521a, 521a', 523a and 523a', and such materials are deposited to have a depth within a range from 0.01 to 3 μm using a sputtering or evaporation method.

Meanwhile, an upper micromirror 530a is deposited at the center portion of the lower support 511a. The upper micromirror 530a includes a plurality of open holes $531a_1$ to $531a_3$. In this case, the open holes $531a_1$ to $531a_3$ are preferably formed in a rectangular shape, but may be formed in any closed shape such as a circle or an ellipse. Furthermore, the lower support 511a and the upper micromirror 530a may be called an upper reflective part 540a. If the lower support is made of a light-reflective material, a separate upper micromirror does not need to be deposited, and the lower support alone functions as the upper reflective part 540a.

Such open holes $531a_1$ to $531a_3$ allow light incident on the element 510a to pass therethrough so that the light is incident on the portions of the lower micromirror 503a corresponding to the open holes $531a_1$ to $531a_3$, thus enabling the lower and upper micromirrors 503a and 530a to form pixels.

That is, for example, a portion (A) of the upper micromirror 530a, in which the open holes $531a_1$ to $531a_3$ are formed, and a portion (B) of the lower micromirror 503a can form a single pixel.

In other words, since the upper micromirror 530a has a reflective surface, it reflects incident light to form reflected light while it allows the incident light to reach the lower reflective part 503a through the open holes. The lower reflective part 503a then reflects incident light to form reflected light, thus light reflected from the upper micromirror 530a and light reflected from the lower reflective part 503a interfere with each other, thereby forming diffracted light. The intensity of diffracted light depends on the distance between the upper micromirror 530a and the lower reflective part 503a.

Figure 5:
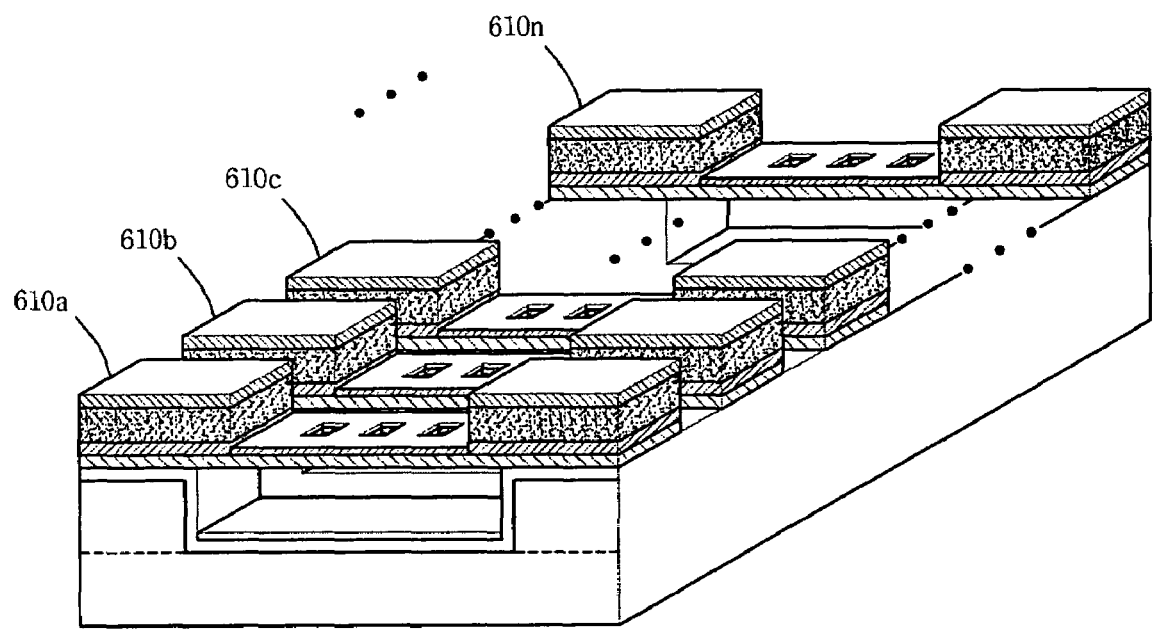
FIG. 5 illustrates an element 1-D array structure of the open-hole based diffractive light modulator according to the first embodiment of the present invention.
Figure 6:
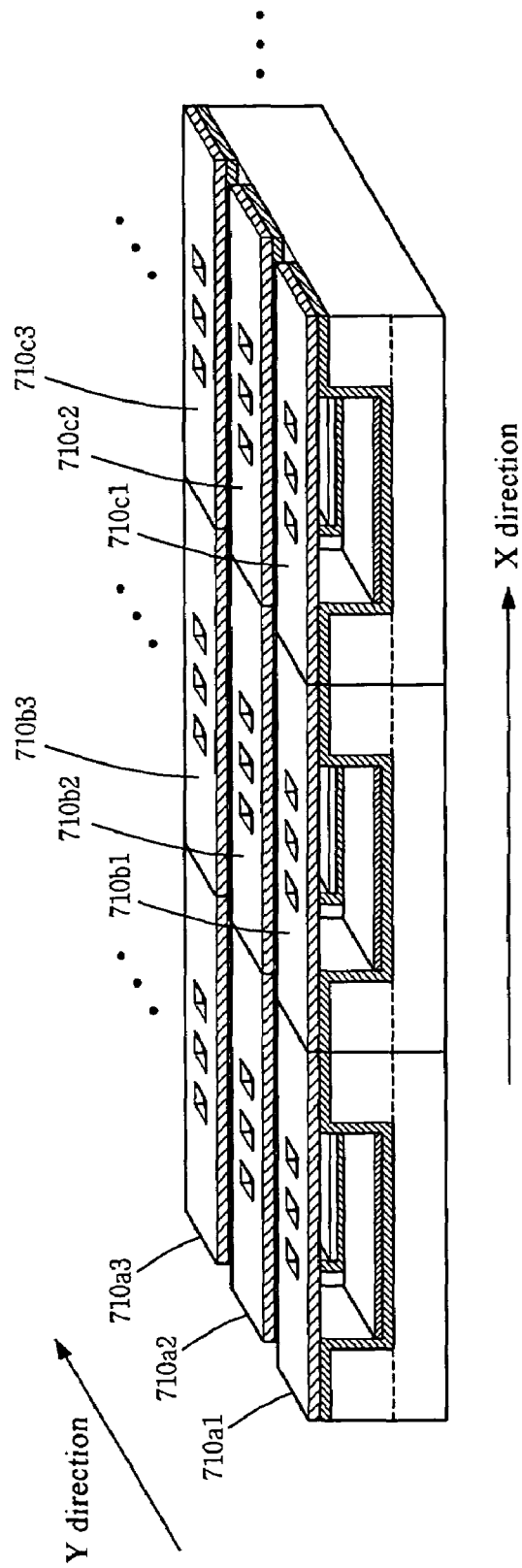
FIG. 6 illustrates an element 2-D array structure of the open-hole based diffractive light modulator according to the seventh embodiment of the present invention.

In this case, incident light passing through the open holes $531a_1$ to $531a_3$ of the upper micromirror 530a can be incident on the corresponding portions of the lower micromirror 503a, and the maximal diffracted light is generated when the height difference between the upper micromirror 530a and the lower micromirror 503a is one of odd multiples of λ/4. As well, herein, only one element 510a is illustrated, but the open-hole based diffractive light modulator of the present invention may include a plurality of elements which are parallel to each other. In other words, the open-hole based diffractive light modulator of the present invention may include element arrays, which case is shown in FIGS. 5 and 6.

When using the element arrays according to the present invention, it is possible to realize a display device having a desired pixel using fewer elements than the conventional technology.

For example, in a conventional technology, it is possible to form one pixel using at least two ribbon-shaped elements. In the conventional technology, when two ribbon-shaped elements constitute one pixel, diffraction efficiency is 50% or less, thus four or six elements constitute one pixel so as to increase diffraction efficiency. When four or more elements constitute one pixel, diffraction efficiency is 70% or more, thus it is possible to gain desired maximum efficiency through an increase in the number of elements. In the first embodiment of the present invention, three open holes 531a1–531a3 are formed through the upper micromirror 530a constituting an upper part of one element 510a to pass incident light therethrough to reach the lower reflective part 503a, thereby gaining the same diffraction efficiency as the conventional technology that uses six elements to form one pixel. That is to say, a mirror part adjacent to the first open hole 531a1 of the upper micromirror 530a according to the first embodiment of the present invention reflects incident light to function as one ribbon element of the conventional technology. Furthermore, a portion of the lower reflective part 503a, which is positioned under the first open hole 531a1 so as to correspond in position to the first open hole, reflects incident light passing through the first open hole 531a1, thereby functioning as another ribbon element. Additionally, a mirror part adjacent to the second open hole 531a2 of the upper micromirror 530a reflects incident light to function as another ribbon element of the conventional technology, and the portion of the lower reflective part 503a that is positioned under the second open hole 531a2 so as to correspond in position to the second open hole reflects incident light passing through the second open hole 531a2, thereby functioning as another ribbon element. As well, a mirror part adjacent to the third open hole 531a3 of the upper micromirror 530a reflects incident light to function as another ribbon element of the conventional technology, and the portion of the lower reflective part 503a that is positioned under the third open hole 531a3 so as to correspond in position to the third open hole reflects incident light passing through the third open hole 531a3, thereby functioning as another ribbon element. As described above, if using an upper micromirror 530a having three open holes 531a1–531a3 formed therethrough and the lower reflective part 503a, the same diffraction efficiency that is gained when one pixel is formed using six ribbon elements in the conventional technology can be gained using one ribbon element 510a.

If a digital TV HD format, which corresponds to 1080×1920, is realized using the above-mentioned diffractive light modulator, 1080 pixels are vertically arranged and each pixel is subjected to 1920 optical modulations, thereby forming one frame.

If one pixel is formed using four or six driving ribbons through the conventional technology, 1080×4 (or 6) driving ribbons are required to form 1080 pixels. On the other hand, when using a ribbon-shaped element having two or three open holes according to the present invention, it is possible to form 1080 pixels using only 1080×1 ribbon element. Thus, the fabrication is easily achieved, productivity increases, and it is possible to fabricate a device having a small size.

Figure 4B:
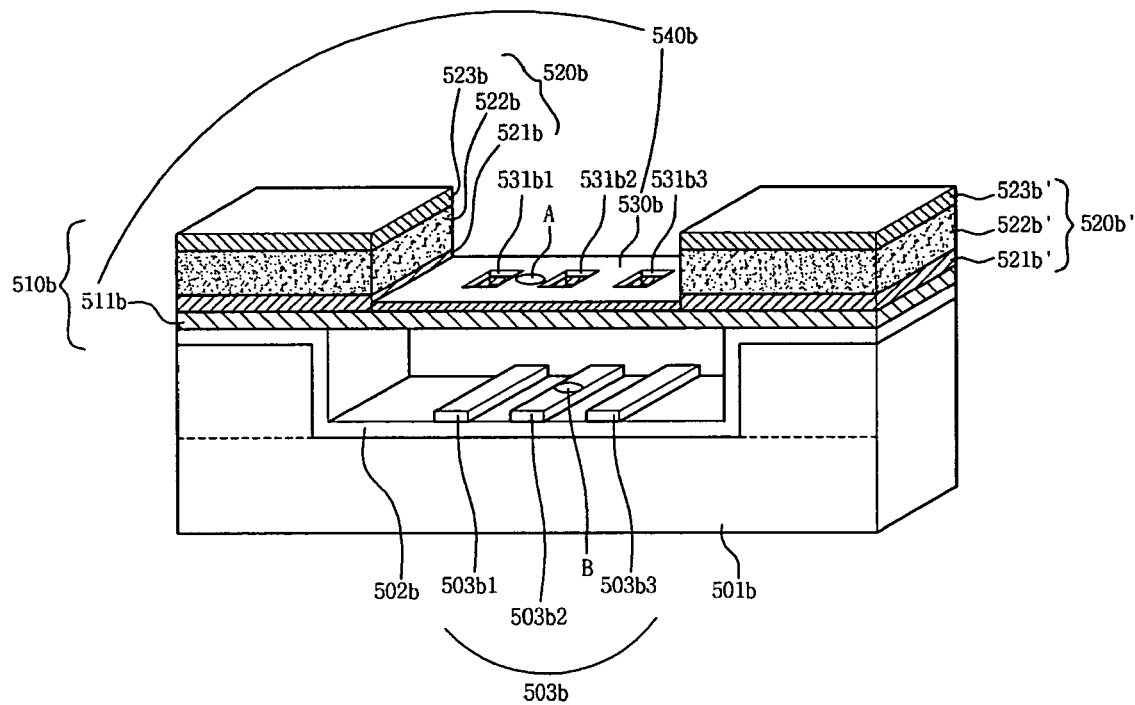
FIG. 4b is a perspective view of an open hole-based diffractive light modulator, which is partially broken away, according to the second embodiment of the present invention.

FIG. 4b is a perspective view of an open hole-based diffractive light modulator, which is partially broken away, according to the second embodiment of the present invention.

Referring to the drawing, the open hole-based diffractive light modulator according to the second embodiment of the present invention comprises a base member 501b, a lower reflective part 503b and an element 510b.

Unlike the first embodiment, the lower reflective part 503b includes a plurality of lower reflective patterns 503b1–503b3, and the plurality of lower reflective patterns 503b1–503b3 is provided on the surface of an insulating layer 502a at intervals so that they correspond in position to open holes 531b1–531b3 of an upper micromirror 530b. The other constructions are the same as those of FIG. 4a.

Figure 4C:
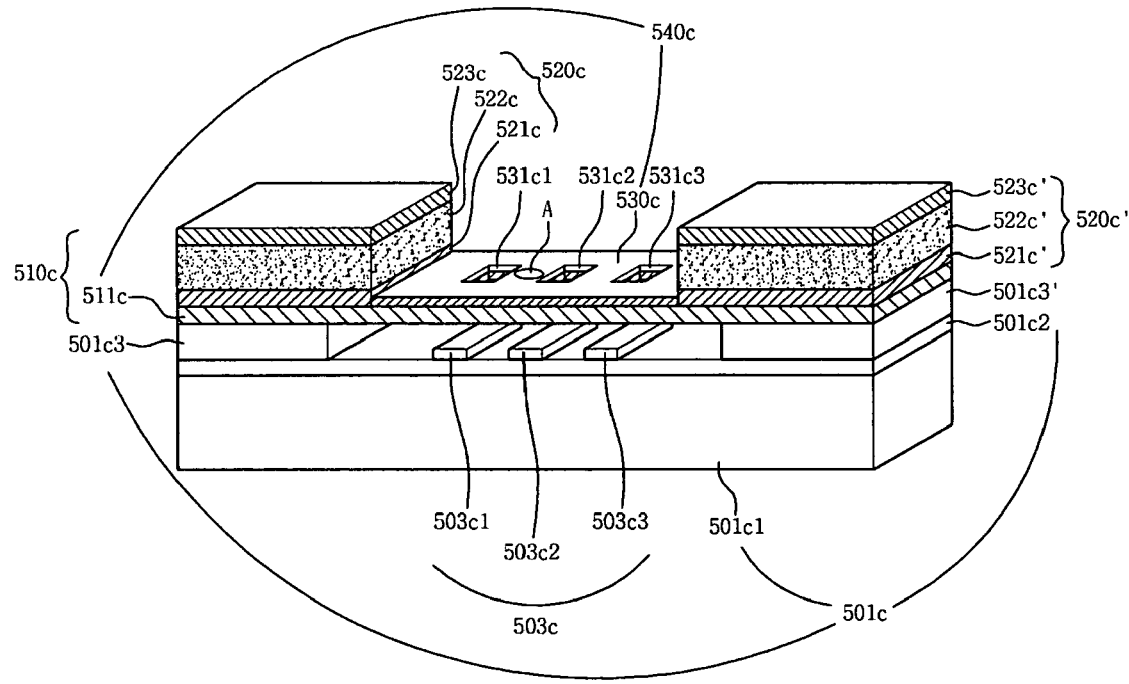
FIG. 4c is a perspective view of an open hole-based diffractive light modulator, which is partially broken away, according to the third embodiment of the present invention.

FIG. 4c is a perspective view of an open hole-based diffractive light modulator, which is partially broken away, according to the third embodiment of the present invention.

Referring to the drawing, the open hole-based diffractive light modulator according to the third embodiment of the present invention comprises a base member 501c which includes a SIMOX SOI (separation by implanted oxygen silicon-on-insulator) substrate (hereinafter, referred to as "silicon-on-insulator substrate"), a lower reflective part 503c, and an element 510c.

The third embodiment of the present invention is different from the first embodiment of FIG. 4a in that the silicon-on-insulator substrate, rather than a silicon substrate, is used as the base member 501c. Its fabrication is well known, thus a detailed description of it is omitted herein.

The base member 501c of the silicon-on-insulator used in the present invention comprises a silicon substrate 501c1, a silicon oxide insulating layer 501c2 which is formed by implanting oxygen ions in the silicon substrate, and a sacrificial silicon layer 501c3 which is formed by implanting a high concentration of oxygen in the silicon substrate. The portion of the sacrificial silicon layer 501c3 that is positioned under an upper micromirror 530a is etched so as to assure a movement space (air space) in which the element 510c is capable of vertically moving. Furthermore, the portion of the sacrificial silicon layer 501c3 that is positioned under piezoelectric layers 520a, 520a', is partially etched so that the upper micromirror 530a is actuated by the shrinkage and expansion of piezoelectric materials 522c, 522c' of the piezoelectric layers 520c, 520c'. As well, the silicon oxide insulating layer 501c2 may be considered an etching prevention layer for preventing the silicon substrate 501c1 from being etched when the silicon sacrificial layer 501c3 is etched.

Furthermore, the third embodiment of the present invention is also different from the first embodiment in that the lower reflective part 503c includes a plurality of lower reflective patterns 503c1–503c3 which are spaced apart from each other. In this respect, it is the same as the second embodiment.

Additionally, the third embodiment of the present invention is different from the first embodiment in that the sacrificial silicon layer 501c3 provides the movement space (air space) for the element 510c. That is to say, in the third embodiment of the present invention, it is unnecessary to provide a separate recess on the silicon substrate 501c1. In this respect, the sacrificial silicon layer 501c3 may be considered a supporting member for supporting the element 510c so as to provide movement space for the element 510c. Furthermore, the other construction and operation of the open-hole based diffractive light modulator according to the third embodiment of the present invention are the same as those of the first embodiment.

Figure 4D:
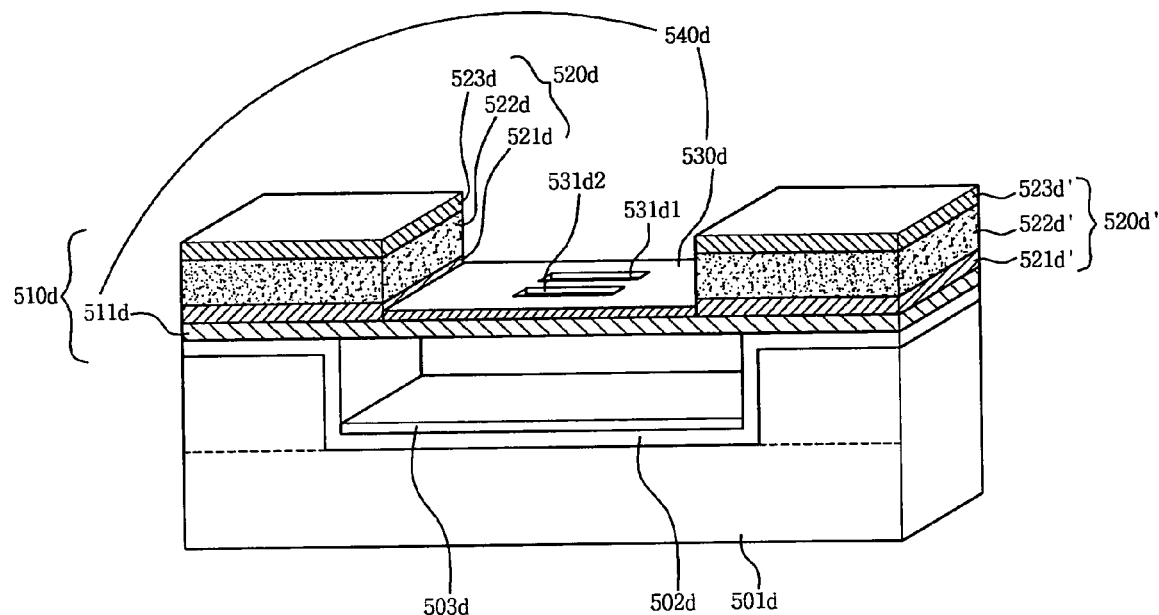
FIG. 4d is a perspective view of an open hole-based diffractive light modulator, which is partially broken away, according to the fourth embodiment of the present invention.

FIG. 4d is a perspective view of an open hole-based diffractive light modulator, which is partially broken away, according to the fourth embodiment of the present invention, and the light modulator comprises a base member 501d including a silicon substrate, a lower reflective part 503d, and an element 510d.

The fourth embodiment of FIG. 4d is different from the embodiment of FIG. 4a in that open holes 531d1–531d3 are not longitudinally arranged, but are transversely arranged. The other constructions are the same as those of FIG. 4a.

Figure 4E:
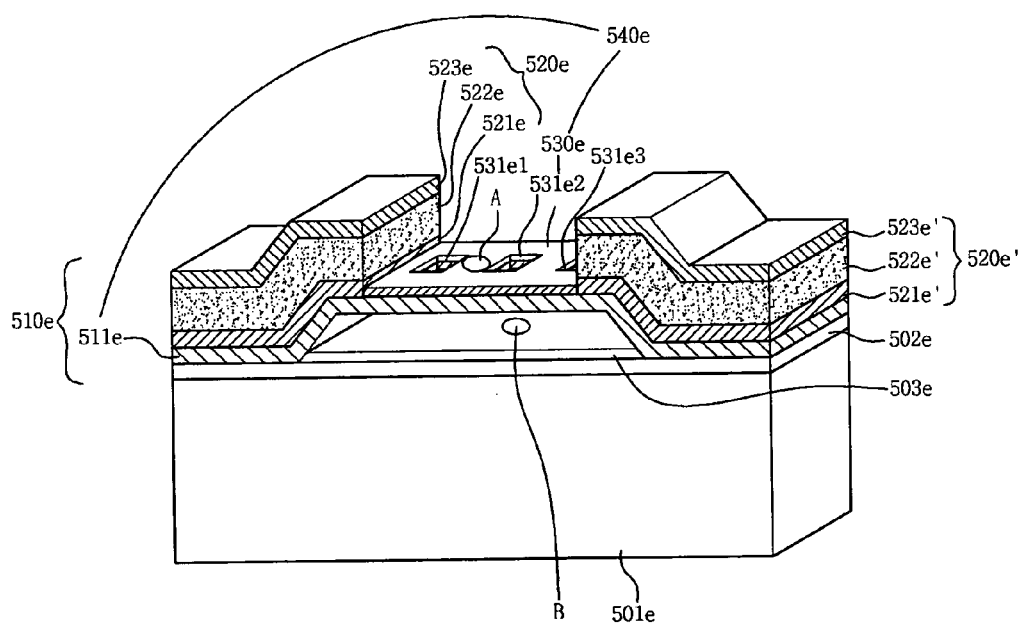
FIG. 4e is a perspective view of an open hole-based diffractive light modulator, which is partially broken away, according to the fifth embodiment of the present invention.

FIG. 4e is a perspective view of an open hole-based diffractive light modulator, which is partially broken away, according to the fifth embodiment of the present invention.

Referring to the drawing, the open hole-based diffractive light modulator according to the fifth embodiment is different from the open-hole based diffractive light modulators of the first to fourth embodiments in that a lower support 511e of an element 510e is raised from a base member 501e of a silicon substrate so as to provide a space. As a result, the element 510e can move vertically.

That is, the element 510e has an upper micromirror 530e for reflecting the incident light, and can move vertically while being raised from the base member 501e. In this case, if the lower support has light-reflective characteristics, the lower support can be implemented to function as a micromirror without needing to form a separate micromirror.

The lower support 511e of the element 510e is raised to provide the air space to the element 510e, and both sides thereof are attached to the base member 501e.

Furthermore, an insulating layer 502e and a lower reflective part 503e are deposited on the base member 501e including the silicon substrate, and the lower reflective part 503e reflects incident light passing through open holes. In this case, if the insulating layer has light-reflective characteristics, the insulating layer can function as the lower reflective part without needing to form a separate lower reflective part.

The element 510e may be formed in a ribbon shape, the central portion thereof is positioned to be raised and spaced apart from the base member 501e, and the bottoms of both sides thereof are attached to the base member 501e.

Piezoelectric layers 520e and 520e' form the left and right sides of the upper portion of the element 510e, respectively. The piezoelectric layer 520e or 520e' includes a lower electrode layer 5213 or 521e' adapted to provide piezoelectric voltage, a piezoelectric material layer 5223 or 522e' formed on the lower electrode layer 5213 or 521e' and adapted to generate a vertical actuating force through shrinkage and expansion when voltage is applied to both sides thereof, and an upper electrode layer 523e or 523e' formed on the piezoelectric material layer 5223 or 522e' and adapted to provide piezoelectric voltage to the piezoelectric material layer 5223 or 522e'.

When voltage is applied to the upper electrode layers 523e and 523e' and the lower electrode layers 5213 and 521e', the element 510e moves upward and reflects incident light to form reflected light.

An upper micromirror 530e is disposed at the center portion of the element 510e in which the piezoelectric layers 520e and 520e' of the lower support 511e are removed, and open holes 531e$_1$ to 531e$_3$ are provided in the upper micromirror 530e. In this case, the open holes 531e$_1$ to 531e$_3$ are preferably formed in a rectangular shape, but can be formed in any closed shape such as a circle or an ellipse.

Such open holes 531e1–531e3 allow the portions of the lower micromirror 503e corresponding to the open holes 531e$_1$ to 531e$_3$, together with the portions of the upper micromirror 530e adjacent to the open holes 531e$_1$ to 531e$_3$ of the upper micromirror 530e, to form pixels.

That is, for example, a portion (A) of the upper micromirror 530e, in which the open holes 531e$_1$ to 531e$_3$ are formed, and a portion (B) of the lower micromirror 503e form a single pixel.

In this case, incident light passing through the open holes 531e$_1$, to 531e$_3$ of the upper micromirror 530e can be incident on the corresponding portions of the lower micromirror 503e, and it can be understood that the maximal diffracted light is generated when the height difference between the upper micromirror 530e and the lower micromirror 503e is one of odd multiples of $\lambda/4$.

Figure 4F:
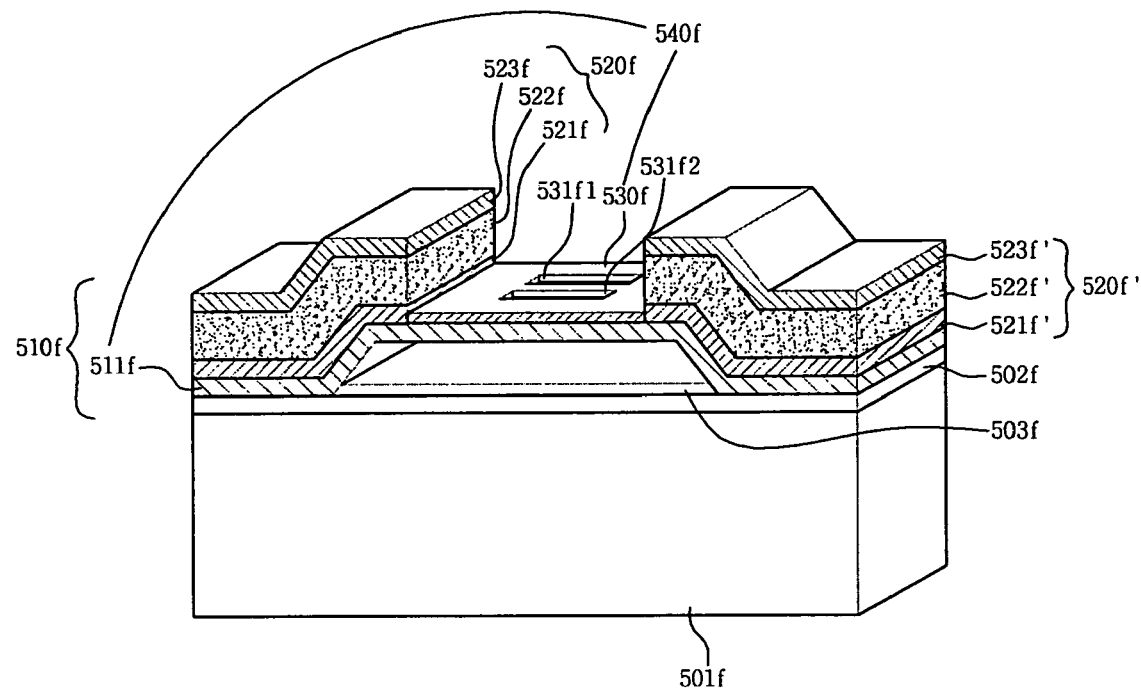
FIG. 4f is a perspective view of an open hole-based diffractive light modulator, which is partially broken away, according to the sixth embodiment of the present invention.

FIG. 4f is a perspective view of an open hole-based diffractive light modulator, which is partially broken away, according to the sixth embodiment of the present invention.

Referring to the drawing, the open hole-based diffractive light modulator according to the sixth embodiment is different from the open hole-based diffractive light modulator according to the fifth embodiment in that open holes are arranged in a transverse direction. The other constructions are the same as those of the open hole-based diffractive light modulator shown in FIG. 4e.

Figure 4G:
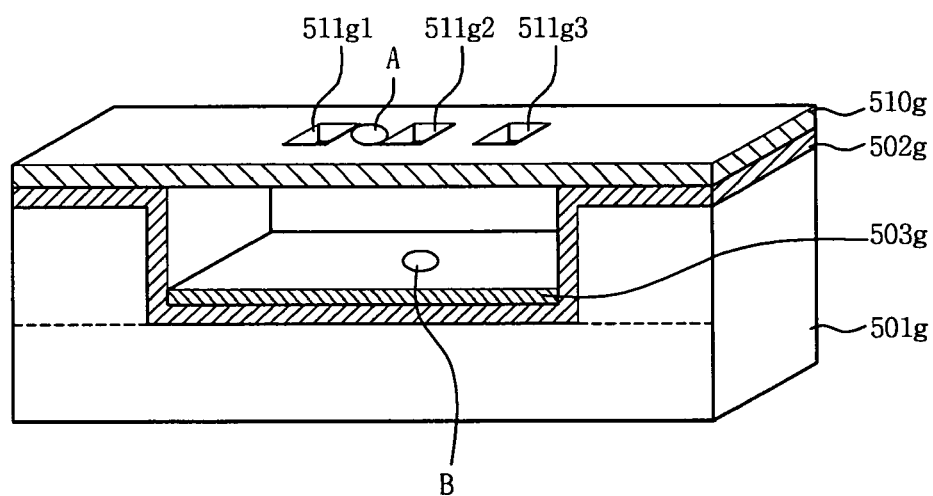
FIG. 4g is a perspective view of an open hole-based diffractive light modulator, which is partially broken away, according to the seventh embodiment of the present invention.

FIG. 4g is a perspective view of an open hole-based diffractive light modulator, which is partially broken away, according to the seventh embodiment of the present invention. Referring to the drawing, the open hole-based diffractive light modulator according to the seventh embodiment includes a silicon substrate 501g, a lower reflective part 503g layered on the silicon substrate, and an upper micromirror 510g.

Not only is the lower reflective part 503g used as the lower electrode, but it also reflects light to form reflected light.

An upper micromirror 510g has open holes 511g1–511g3 provided therein. In this case, the open holes 511g1–511g3 are preferably formed in a rectangular shape, but can be formed in any closed shape such as a circle or an ellipse.

Such open holes 511g1–511g3 allow the portions of the lower micromirror 503g corresponding to the open holes 511g1–511g3, together with the portions of the upper micromirror 530e adjacent to the open holes 511g1–511g3 of the upper micromirror 510g, to form pixels.

That is, for example, a portion (A) of the upper micromirror 510g, in which the open holes are formed, and a portion (B) of the lower micromirror 503g form a single pixel.

In this case, incident light passing through the open holes 511g1–511g3 of the upper micromirror 510g can be incident on the corresponding portions of the lower micromirror 503g, and it can be understood that the maximal diffracted light is generated when the height difference between the upper micromirror 510g and the lower micromirror 503g is one of odd multiples of $\lambda/4$.

Figure 4H:
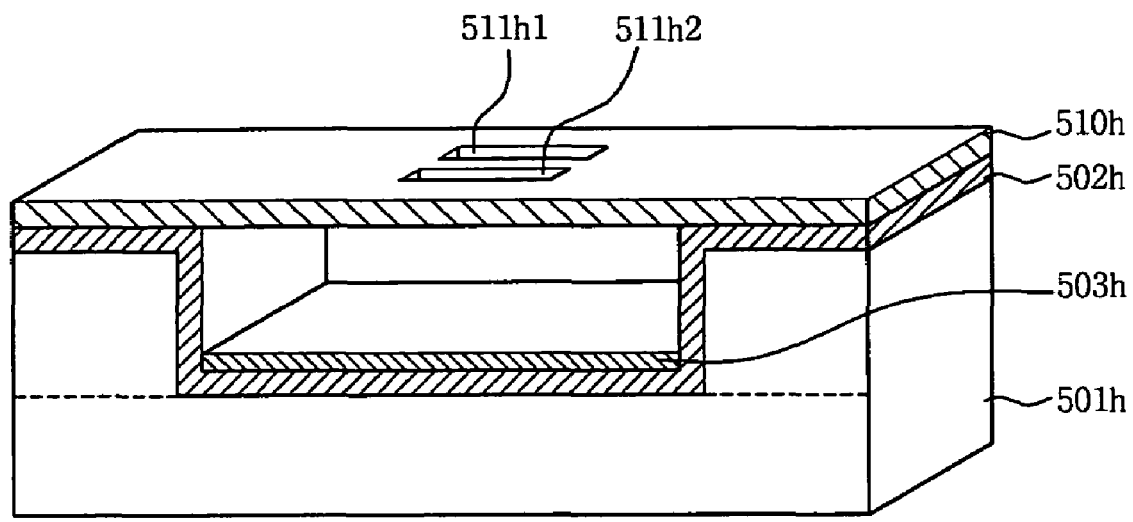
FIG. 4h is a perspective view of an open hole-based diffractive light modulator, which is partially broken away, according to the eighth embodiment of the present invention.

FIG. 4h is a perspective view of an open hole-based diffractive light modulator, which is partially broken away, according to the eighth embodiment of the present invention.

Referring to the drawing, the open hole-based diffractive light modulator according to the eighth embodiment is different from the open hole-based diffractive light modulator according to the seventh embodiment in that open holes are transversely arranged. The other constructions are the same as those of FIG. 4g. Meanwhile, in the first to sixth embodiments of the present invention, a vertical actuating force is generated using the piezoelectric material layer, and, in the seventh and eighth embodiments, the vertical actuating force is generated using an electrostatic force. Furthermore, the vertical actuating force may be generated using an electromagnetic force.

Meanwhile, in the fourth to eighth embodiments, one mirror layer constitutes the lower reflective part, but, as shown in the second embodiment, the lower reflective part may include a plurality of lower reflective patterns at intervals. That is to say, the lower reflective part includes the plurality of lower reflective patterns, and the plurality of lower reflective patterns is provided on a surface of the insulating layer at intervals so that they correspond in position to the open holes of the upper micromirror.

Figure 4I:
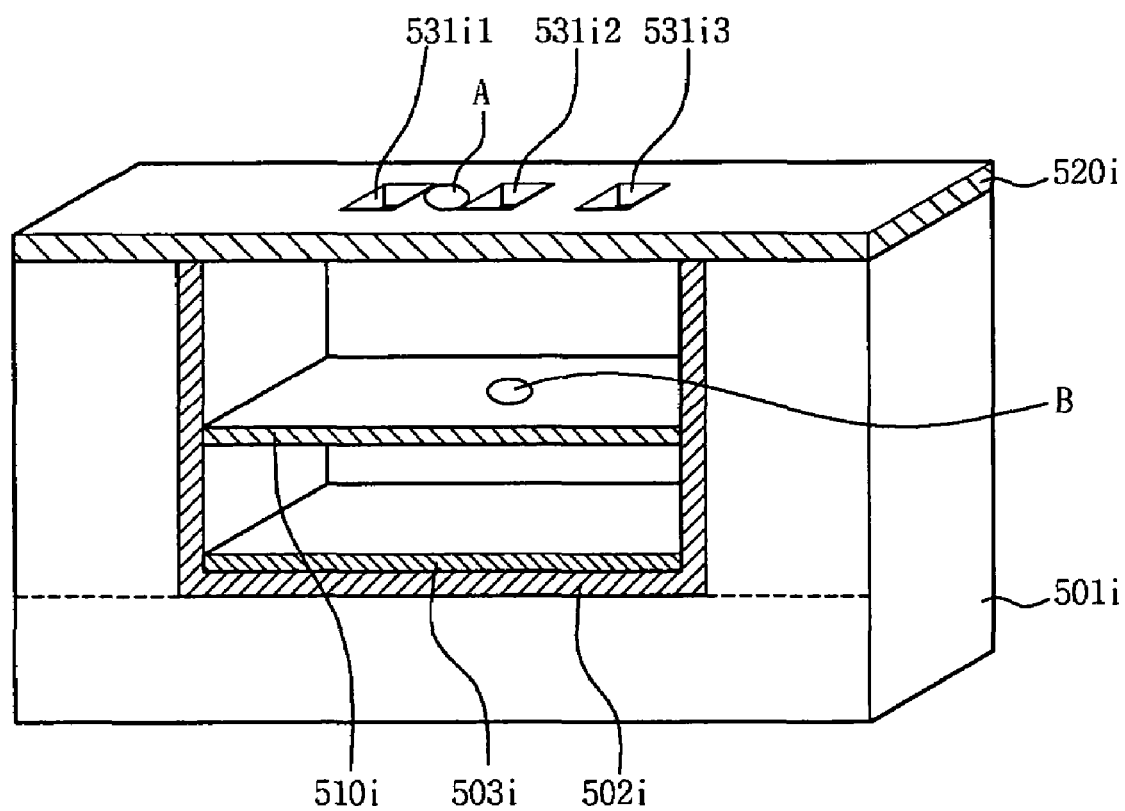
FIG. 4i is a perspective view of an open hole-based diffractive light modulator, which is partially broken away, according to the ninth embodiment of the present invention.

FIG. 4i is a perspective view of an open hole-based diffractive light modulator, which is partially broken away, according to the ninth embodiment of the present invention.

Referring to the drawing, the open hole-based diffractive light modulator according to the ninth embodiment of the present invention comprises a base member 501i including a silicon substrate, a lower reflective part 510i formed in the middle of the recess of the base member 501i, and an upper micromirror 520i adapted to span the uppermost surfaces of the base member 501i. The lower reflective part 510i not only reflects incident light to form reflected light, but is also used as the upper electrode.

A lower electrode layer 503i is formed on the bottom of the recess of the base member 501i. The lower electrode layer 503i, together with the lower reflective part 510i (upper electrode) positioned in the middle of the recess, provides the lower reflective part 510i with a vertical actuating force that is caused by an electrostatic force.

That is, the lower electrode 503i and the lower reflective part 510i attract each other due to an electrostatic force and generate a downward actuating force if voltage is applied thereto, or they generate an upward actuating force by a restoring force if the voltage is not applied thereto.

Meanwhile, open holes 531i1–531i3 are provided in the upper micromirror 520i. The open holes 531i1–531i3 are preferably formed in a rectangular shape, but may be formed in any closed shape such as a circle or an ellipse.

Such open holes 531i1–531i3 enable the portions of the lower reflective part 510i corresponding to the open holes 531i1–531i3, together with the portions of the upper micromirror 520i adjacent to the open holes 531i1–531i3, to form pixels.

That is, for example, a portion (A) of the upper micromirror 520i, in which the open holes 531i1–531i3 are formed, and a portion (B) of the lower reflective part form a single pixel.

In this case, incident light passing through the open holes of the upper micromirror 520i can be incident on the corresponding portions of the lower reflective part 510i, and it can be understood that the maximal diffracted light is generated when the height difference between the upper micromirror 520i and the lower reflective part 520i is one of odd multiples of $\lambda/4$.

Figure 4J:
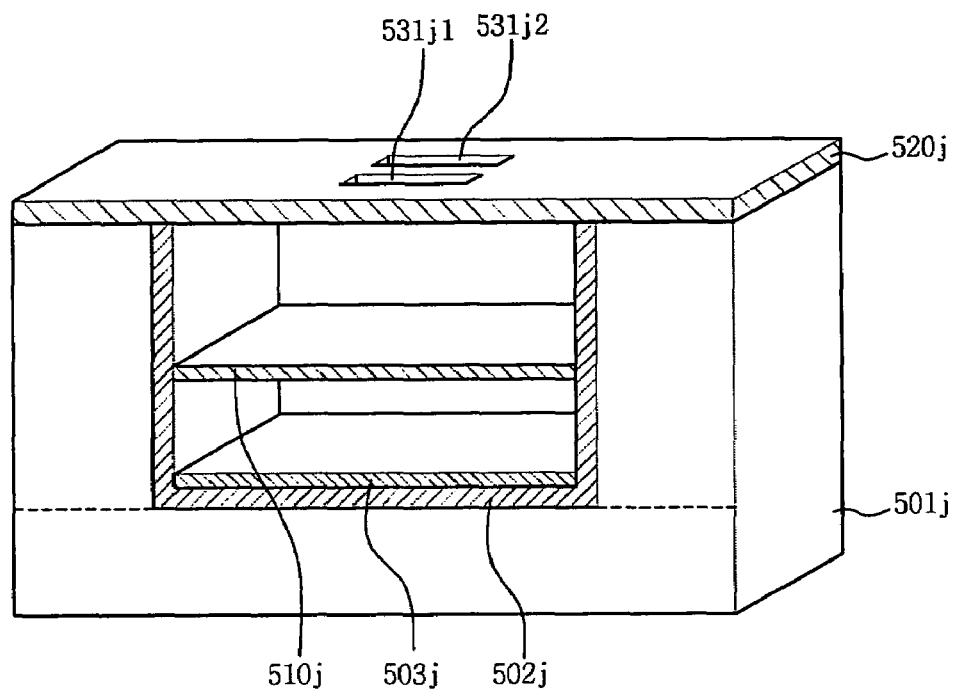
FIG. 4j is a perspective view of an open hole-based diffractive light modulator, which is partially broken away, according to the tenth embodiment of the present invention.

FIG. 4j illustrates an open hole-based light modulator according to the tenth embodiment of the present invention, which is different from that of the ninth embodiment in that open holes are transversely arranged.

Meanwhile, in the fourth embodiment, and the seventh to tenth embodiments, the silicon substrate is used as the base member, but, as shown in the third embodiment, the silicon-on-insulator substrate may be used.

FIG. 5 is a perspective view showing an element 1-D array of the open-hole based diffractive light modulator according to the first embodiment of the present invention.

Referring to the drawing, in the element 1-D array of the open hole-based diffractive light modulator according to the first embodiment of the present invention, a plurality of elements 610a–610n having the upper micromirror is unidirectionally arranged parallel to each other, thus diffracting incident light. Meanwhile, only the element 1-D array of the open-hole based diffractive light modulator according to the first embodiment has been described herein, but the element 1-D arrays of the open-hole based diffractive light modulators according to the second to tenth embodiments may be identically realized.

FIG. 6 is a perspective view showing an element 2-D array of the open-hole based diffractive light modulator according to the seventh embodiment of the present invention.

Referring to the drawing, in the element 2-D array of the open-hole based diffractive light modulator according to the seventh embodiment of the present invention, a plurality of elements 710a1–710nn is arranged in X- and Y-directions. Only the element 2-D array of the open-hole based diffractive light modulator according to the seventh embodiment has been described herein, but the element 2-D arrays according to the other embodiments may be identically realized.

Meanwhile, although the case of a single piezoelectric material layer has been described in this specification, it is possible to implement a multi-type piezoelectric material layer formed of a plurality of piezoelectric material layers.

Figure 7:
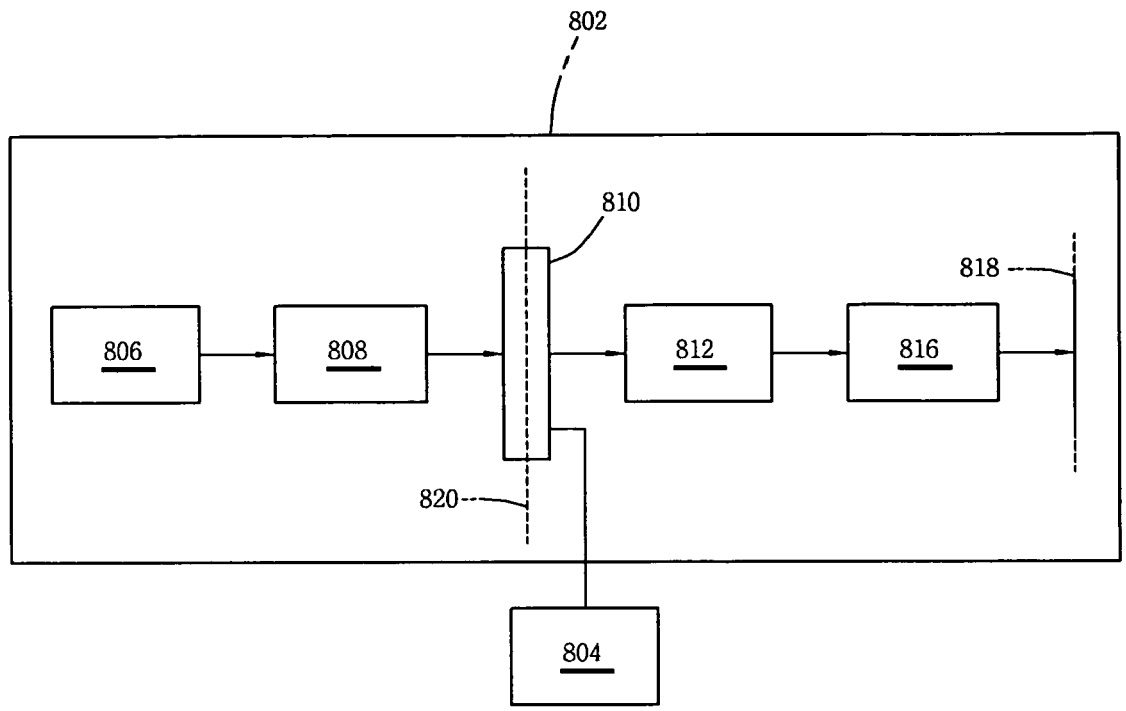
FIG. 7 illustrates a display system using the open-hole based diffractive light modulator according to the embodiment of the present invention.

FIG. 7 illustrates a display device using the open-hole based diffractive light modulator according to the embodiment of the present invention. As described above, an optical system such as that used in a display device can also be used in a printer, and, in this case, a drum is used instead of a screen 818 as described later. In the case in which the drum is used, since the drum rotates, a separate scanning optical part rotates as in the display device, thus it is not essentially required to use a scanning optical part.

Referring to FIG. 7, the display device employing the diffractive light modulator according to the embodiment of the present invention comprises a display optical system 802 and a display electronic system 804. The display optical system 802 comprises a light source 806, a light optical part 808 for converting light which is emitted from the light source 806 into linear light so as to irradiate an open-hole based diffractive light modulator 810 in the form of linear light, the open-hole based diffractive optical modulator 810 for modulating linear light which is formed by the light optical part 808 to form diffracted light, a filtering optical part 812 for separating orders of diffracted light beams which are modulated by the open-hole based diffractive light modulator 810 to pass the desired order of diffracted light beam of the various orders of diffracted light beams therethrough, a projection and scanning optical part 816 for condensing diffracted light beams which pass through the filtering optical part 812 to scan condensed point light in a 2-D image, and a display screen 818.

The display electronic system 804 is connected to the light source 806, the open-hole based diffractive light modulator 810, and the projection and scanning optical part 816.

Furthermore, if linear light is incident from the light optical part 808 onto the open-hole based diffractive light modulator 810, the modulator modulates incident light through a control of the display electronic system 804 to generate diffracted light, thus emitting it.

Figure 8A:
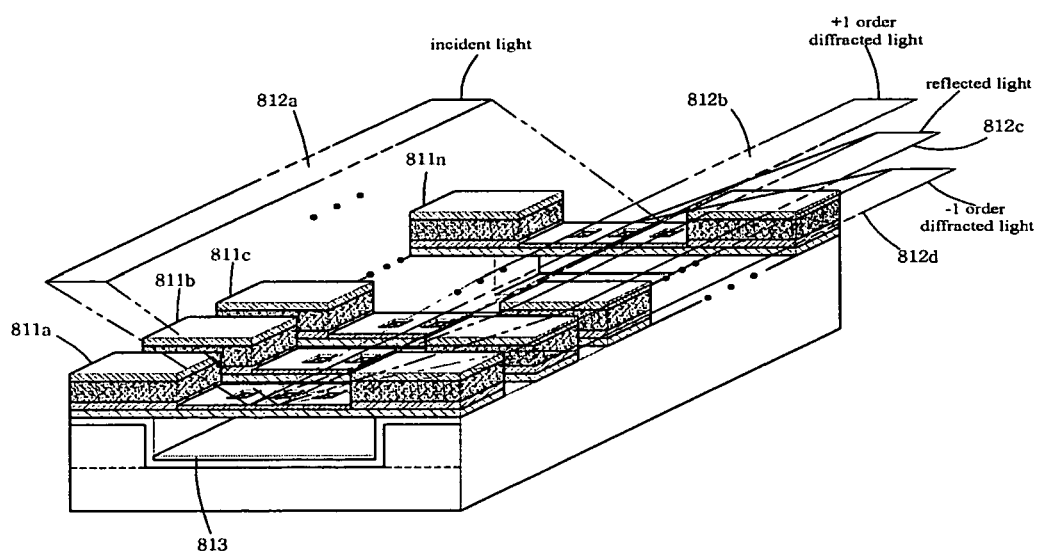
FIG. 8a is a perspective view of the open-hole based diffractive light modulator according to the embodiment of the present invention, in which incident light obliquely irradiates the upper micromirror of an element 1-D array.

FIG. 8a is a perspective view of an open-hole based diffractive light modulator in which linear light obliquely irradiates a plurality of upper micromirrors 812a–611n of an element 811a–611n 1-D array. If the plurality of upper micromirrors 812a–612n vertically moves, incident linear light is modulated due to a height difference between the upper micromirrors 812a–612n and a lower reflective part 813, thereby creating diffracted light. In this case, diffracted light is obliquely emitted because light is obliquely incident.

Figure 8B:
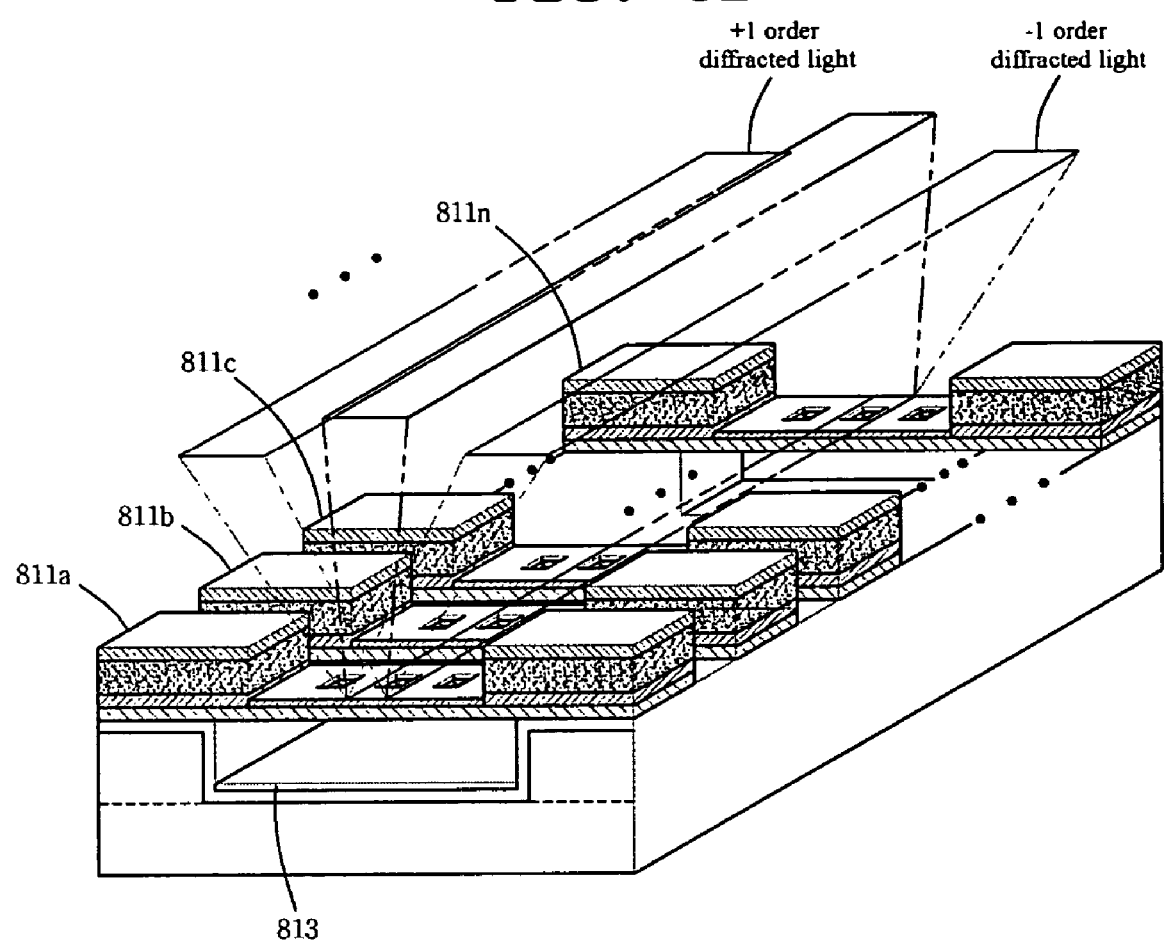
FIG. 8b is a perspective view of the open-hole based diffractive light modulator according to the embodiment of the present invention, in which light is perpendicularly incident on an upper micromirror of an element 1-D array.

FIG. 8b is a perspective view of the open-hole based diffractive light modulator in which linear light perpendicularly irradiates a plurality of upper micromirrors 812a–611n of an element 811a–611n 1-D array. If the plurality of upper micromirrors 812a–612n vertically moves, incident linear light is modulated due to a height difference between the upper micromirrors 812a–612n and a lower reflective part 813, thereby creating diffracted light. In this case, a 0 order diffracted light beam is perpendicularly emitted and ±1 order diffracted light beams are obliquely emitted, left and right, because light is perpendicularly incident.

Meanwhile, the filtering optical system 812 separates the desired orders of diffracted light beams from various orders of the diffracted light beams when diffracted light beams are incident thereon. The filtering optical system 812 includes a Fourier lens (not shown) and a filter (not shown), and selectively passes 0 or ±1 order diffracted light beams therethrough.

As well, the projection and scanning optical part 816 includes a condensing lens (not shown) and a scanning mirror (not shown), and scans diffracted light beams on the screen 818 while controlling the display electronic system 804.

The display electronic system 804 drives a scanning mirror (not shown) of the projection and scanning optical device 816. The projection and scanning optical device 816 projects an image on the display screen 818 and scans it on the display screen 818 in order to form a 2-D image on the display screen 818.

Meanwhile, in FIGS. 7 to 8b, only the generation of a monochromic image has been described, but it is possible to generate a color image. It is possible to implement the generation of the color image by additionally applying two light sources, two diffractive light modulators, and a filter to the display optical system 802.

As described above, the present invention aims to form one pixel using one driving ribbon element.

Furthermore, the present invention aims to form a plurality of open holes through an upper micromirror of the ribbon element, thereby creating diffracted light with improved diffraction efficiency.

As well, the present invention aims to substitute one driving element for four or six conventional driving elements, thereby improving the yield in the fabrication process and reducing fabrication costs.

What is claimed is:

1. An open hole-based diffractive light modulator, comprising:
   (a) a base member;
   (b) a first ribbon-shaped reflective part supported by the base member, comprising:
      an intermediate portion spaced apart from the base member so as to define a space therebetween;
      a first surface facing away from said base member and functioning as a reflective surface to reflect incident light;
      at least one open hole extending through said first reflective part and formed so as to pass the incident light therethrough;
   (c) a second reflective part located between the first reflective part and the base member, said second reflective part:
      spaced apart from the first reflective part; and
      comprising a reflective surface facing the first reflective part to reflect the incident light passing through the at least one open hole; and
   (d) an actuating unit for moving the intermediate portion of the first reflective part relative to the second reflective part to change the intensity of diffracted light which is formed using light reflected from the first reflective part and the second reflective part, wherein the actuating unit comprises a piezoelectric layer which is positioned at a first location other than the location of the intermediate portion of the first reflective part, said piezoelectric layer operable to shrink and expand so as to provide an actuating force in a direction lateral to the first reflective part when voltage is applied to opposite sides of the piezoelectric layer.

2. The open hole-based diffractive light modulator as set forth in claim 1, wherein the base member comprises:
   a substrate; and
   supporting members protruding from the substrate, which support spaced apart locations of the first reflective part in such a way that the intermediate portion of the first reflective part is spaced apart from the substrate to form the space therebetween;
   wherein the second reflective part is positioned relative to the substrate to reflect the incident light passing through the open holes of the first reflective part.

3. The open hole-based diffractive light modulator as set forth in claim 2, further comprising an insulating layer interposed between the substrate and the second reflective part.

4. The open hole-based diffractive light modulator as set forth in claim 1, wherein the base member defines a recess to provide the space, the second reflective part is disposed in the recess of the base member, and the first reflective part traverses the recess so that the intermediate portion thereof is spaced apart from the second reflective part to form a space therebetween.

5. An open hole-based diffractive light modulator as set forth in claim 4, wherein: the first reflective part spanning the recess of the base member the second reflective part is supported by the sidewalls of the recess of the base member to be parallelly spaced apart from the first reflective part, the second reflective part moveable toward or away from the first reflective part to reflect the incident light passing through the open holes; and
   the actuating unit moving the second reflective part relative to the first reflective part to change the intensity of diffracted light which is formed using light reflected from the first reflective part and the second reflective part.

6. The open hole-based diffractive light modulator as set forth in claim 4, further comprising an insulating layer interposed between the base member and the second reflective part.

7. The open hole-based diffractive light modulator as set forth in claim 1, wherein the first reflective part comprises:
   a first support layer having an intermediate portion which is disposed relative to the base member so as to form a space therebetween, the support layer supported by the base member and defining at least one open hole formed so as to pass the incident light therethrough; and a first micromirror disposed on the first support layer to nominally face away from the base member, said first micromirror defining at least one open hole corresponding in position to the at least one open hole of the first support layer and formed so as to pass the incident light therethrough and which also has a surface functioning as the reflective surface to reflect the incident light.

8. The open hole-based diffractive light modulator as set forth in claim 1, wherein the first reflective part is contoured so that the intermediate portion thereof is spaced apart from the second reflective part so as to provide the space therebetween.

9. The open hole-based diffractive light modulator as set forth in claim 1, wherein the first reflective part has a plurality of open holes arranged in a direction that is same as a direction in which the first reflective part traverses the base member.

10. An open hole-based diffractive light modulator, comprising:
(a) a base member;
(b) a first reflective part supported by the base member, comprising:
an intermediate portion spaced apart from the base member so as to define a space therebetween;
a first surface facing away from said base member and functioning as a reflective surface to reflect incident light;
a plurality of open holes arranged in a direction that is lateral to a direction in which the first reflective part traverses the base member, said open holes extending through said first reflective part and formed so as to pass the incident light therethrough;
(c) a second reflective part located between the first reflective part and the base member, said second reflective part:
spaced apart from the first reflective part;
comprising a reflective surface facing the first reflective part to reflect the incident light passing through the at least one open hole; and
(d) an actuating unit for moving the intermediate portion of the first reflective part relative to the second reflective part to change the intensity of diffracted light which is formed using light reflected from the first reflective part and the second reflective part.

11. The open hole-based diffractive light modulator as set forth in claim 1, further comprising at least two piezoelectric layer sections spaced apart from each other at positions relative to the first reflective part.

12. The open hole-based diffractive light modulator as set forth in claim 11, further comprising an electrode layer disposed on the piezo electric layer section to provide piezoelectric voltage.

13. The open hole-based diffractive light modulator as set forth in claim 1, further comprising an electrode layer disposed on the piezoelectric material layer to provide piezoelectric voltage, and wherein, the first reflective part functions as an electrode of the piezoelectric layer.

14. The open hole-based diffractive light modulator as set forth in claim 1, wherein the piezoelectric layer comprises:
a plurality of piezoelectric material layers to generate shrinkage and expansion actuating forces when voltage is applied to both sides thereof;
a plurality of first electrode layers interposed between the plurality of the first piezoelectric material layers to provide piezoelectric voltage;
a second electrode layer disposed on an outermost layer of the plurality of first piezoelectric material layers to provide the piezoelectric voltage; and
wherein the first reflective part functions as an electrode of the piezoelectric layers.

15. The open hole-based diffractive light modulator as set forth in claim 10, wherein the actuating unit comprising a first electrode and a second electrode positioned relative to each other to enable an electrostatic force to be generated between the first and the second electrodes to move the first and second reflective parts relative to each other.

16. The open hole-based diffractive light modulator as set forth in claim 15, wherein the first electrode comprises the first reflection part.

17. The open hole-based diffractive light modulator as set forth in claim 16, wherein the second electrode comprises the second reflective part.

18. The open hole-based diffractive light modulator as set forth in claim 17, wherein the second electrode comprises a semiconductor silicon substrate.

19. The open hole-based diffractive light modulator as set forth in claim 10, wherein the actuating unit is capable of moving the first reflective part using an electromagnetic force.

20. An open hole-based diffractive light modulator, comprising:
a base member;
a plurality of ribbon-shaped first reflective parts arranged to form an array, each of which:
is spaced apart at an intermediate portion thereof from the base member so as to form a space therebetween;
is supported by the base member and has a reflective surface directed away from the base member to reflect incident light; and
has at least one hole formed so as to pass the incident light therethrough;
a second reflective part located between the first reflective part and the base member so as to define a space relative to the upper reflective part and which has a reflective surface to reflect the incident light passing through the open holes; and
a plurality of actuating units for moving the intermediate portion of a corresponding first reflective part to change the intensity of diffracted light which is formed using light reflected from the first reflective part and the second reflective part, wherein the actuating units comprise a piezoelectric layer which is positioned at a first location other than the location of the intermediate portion of the first reflective part, said piezoelectric layer operable to shrink and expand so as to provide an actuating force in a direction lateral to the first reflective part when voltage is applied to opposite sides of the piezoelectric layer.

21. The open hole-based diffractive light modulator as set forth in claim 20, wherein the base member comprises:
a substrate; and
at least one supporting member protruding from the substrate to support the first reflective parts in such a way that the intermediate portion of each of the first reflective parts is spaced apart from the substrate to form the space therebetween;

wherein the second reflective part is positioned relative to the substrate to reflect the incident light passing through the open holes in the plurality of first reflective parts.

22. The open hole-based diffractive light modulator as set forth in claim 20, wherein the base member has a relatively flat surface, intermediate portions of the plurality of the first reflective parts are spaced apart from the second reflective part so as to define spaces therebetween, and the first reflective parts are substantially parallelly arranged to form the array.

23. The open hole-based diffractive light modulator as set forth in claim 20, wherein the base member has portions defining a recess to provide the space, the second reflective part is located in the recess of the base member, and the plurality of the first reflective parts each traverses the recess so that intermediate portions thereof are spaced apart from corresponding second reflective parts to form the spaces therebetween and are arranged to form the array.

24. An open hole-based diffractive light modulator, comprising:
 a base member;
 a plurality of first reflective parts arranged to form an array, each of which:
  is spaced apart at an intermediate portion thereof from the base member so as to form a space therebetween;
  is supported by the base member, each of which has a reflective surface directed away from the base member to reflect incident light; and
  has at least one hole formed so as to pass the incident light therethrough;
 a second reflective part located between the first reflective part and the base member so as to define a space relative to the upper reflective part and which has a reflective surface to reflect the incident light passing through the open holes;
 a plurality of actuating units for moving the intermediate portion of a corresponding first reflective part to change the intensity of diffracted light which is formed using light reflected from the first reflective part and the second reflective part;
 wherein the base member has portions defining a recess to provide the space, the second reflective part is located in the recess of the base member, and the plurality of the first reflective parts each traverses the recess so that intermediate portions thereof are spaced apart from corresponding second reflective parts to form the spaces therebetween and are arranged to form the array;
 wherein said first reflective parts span the recess of the base member;
 wherein said second reflective parts are arranged to form an array and are supported by the sidewalls of the recess of the base member to be parallelly spaced apart from corresponding first reflective parts, the second reflective parts moveable toward or away from a first reflective part to reflect the incident light passing through the open holes; and
 wherein said actuating units move corresponding second reflective parts relative to a first reflective part to change the intensity of diffracted light which is formed using light reflected from the first and second reflective parts.

25. An open hole-based diffractive light modulator, comprising:
 a substrate;
 an insulating layer disposed on the substrate;
 at least one sacrificial layer which is disposed on the insulating layer;
 a reflective part disposed on the insulating layer, said reflective part positioned to reflect incident light;
 a support which is provided on the at least one sacrificial layer and through which first open holes are formed;
 a micromirror shaped in the form of a ribbon and disposed on the support, said a micromirror having a reflective surface to reflect the incident light, second open holes formed in the micromirror to correspond to the first open holes to pass the incident light therethrough; and
 at least one actuating unit to move an intermediate portion of the support when voltage is applied thereto, thereby changing intensity of diffracted light which is formed using light reflected from the micromirror and the reflective part, wherein the actuating units have piezoelectric material, the piezoelectric material disposed on electrodes, so that the actuating units shrink or expand when voltage is applied to the electrodes.

26. The open hole-based diffractive light modulator according to claim 1, wherein the first reflective part flexes under the influence of the actuating unit, thereby to move towards or away from the second part.

27. An open hole-based diffractive light modulator according to claim 1, wherein the first reflective part is elongate and flexible in a direction lateral to its length.

* * * * *